(12) United States Patent
Driskell

(10) Patent No.: US 11,304,786 B2
(45) Date of Patent: Apr. 19, 2022

(54) DENTAL APPARATUS CONTAINER

(71) Applicant: Lois Driskell, West Plains, MO (US)

(72) Inventor: Lois Driskell, West Plains, MO (US)

( * ) Notice: Subject to any disclaimer, the term of this patent is extended or adjusted under 35 U.S.C. 154(b) by 150 days.

(21) Appl. No.: 16/570,554

(22) Filed: Sep. 13, 2019

(65) Prior Publication Data

US 2021/0077236 A1  Mar. 18, 2021

(51) Int. Cl.
*A61C 17/00* (2006.01)
*A45D 44/20* (2006.01)
*A61C 17/16* (2006.01)

(52) U.S. Cl.
CPC ............ *A61C 17/036* (2013.01); *A45D 44/20* (2013.01); *A61C 17/16* (2013.01)

(58) Field of Classification Search
None
See application file for complete search history.

(56) References Cited

U.S. PATENT DOCUMENTS

| | | | | |
|---|---|---|---|---|
| 3,904,058 A | * | 9/1975 | Rosenstein | A45D 44/20 215/6 |
| 4,114,194 A | * | 9/1978 | Walter | A47L 15/13 310/318 |
| 8,353,305 B1 | * | 1/2013 | Barham | A61C 17/036 134/93 |
| 2016/0271656 A1 | * | 9/2016 | Prewitt | A61C 7/08 |

* cited by examiner

*Primary Examiner* — Rita P Adhlakha
(74) *Attorney, Agent, or Firm* — The Iwashko Law Firm, PLLC; Lev Ivan Gabriel Iwashko

(57) ABSTRACT

A dental apparatus container, including a main body to receive at least one of a dental apparatus and cleaning fluid therein, and a lid connected to the main body to cover at least a portion of the main body.

5 Claims, 2 Drawing Sheets

DENTAL APPARATUS CONTAINER

BACKGROUND

1. Field

The present general inventive concept relates generally to a container, and particularly, to a dental apparatus container.

2. Description of the Related Art

Dentures are a type of replacement for teeth for people who have suffered at least some partial loss of teeth. However, dentures can be an embarrassing to different individuals and a container is often used to for storage and/or cleansing of the dentures.

Traditionally, dentures and partial cleaning containers are generally left out in the open when utilized. Additionally, options are limited when it comes to the type of containers because the containers are usually non-discrete, gaudy, and made of material that collects grime and residue.

Therefore, there is a need for a dental apparatus container that obscures dentures and provides cleaning for them.

SUMMARY

The present general inventive concept provides a dental apparatus container.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a dental apparatus container, including a main body to receive at least one of a dental apparatus and cleaning fluid therein, and a lid connected to the main body to cover at least a portion of the main body.

The lid may be hingedly connected to the main body, such that the lid pivots from closed in a first position to at least partially open in a second position.

The hinge may hold the lid in the second position.

The lid may magnetically connect to the main body.

The dental apparatus container may further include a haptic unit disposed within at least a portion of the main body to vibrate the cleaning fluid, such that a volume of the cleaning fluid in contact with the dental apparatus may be increased.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
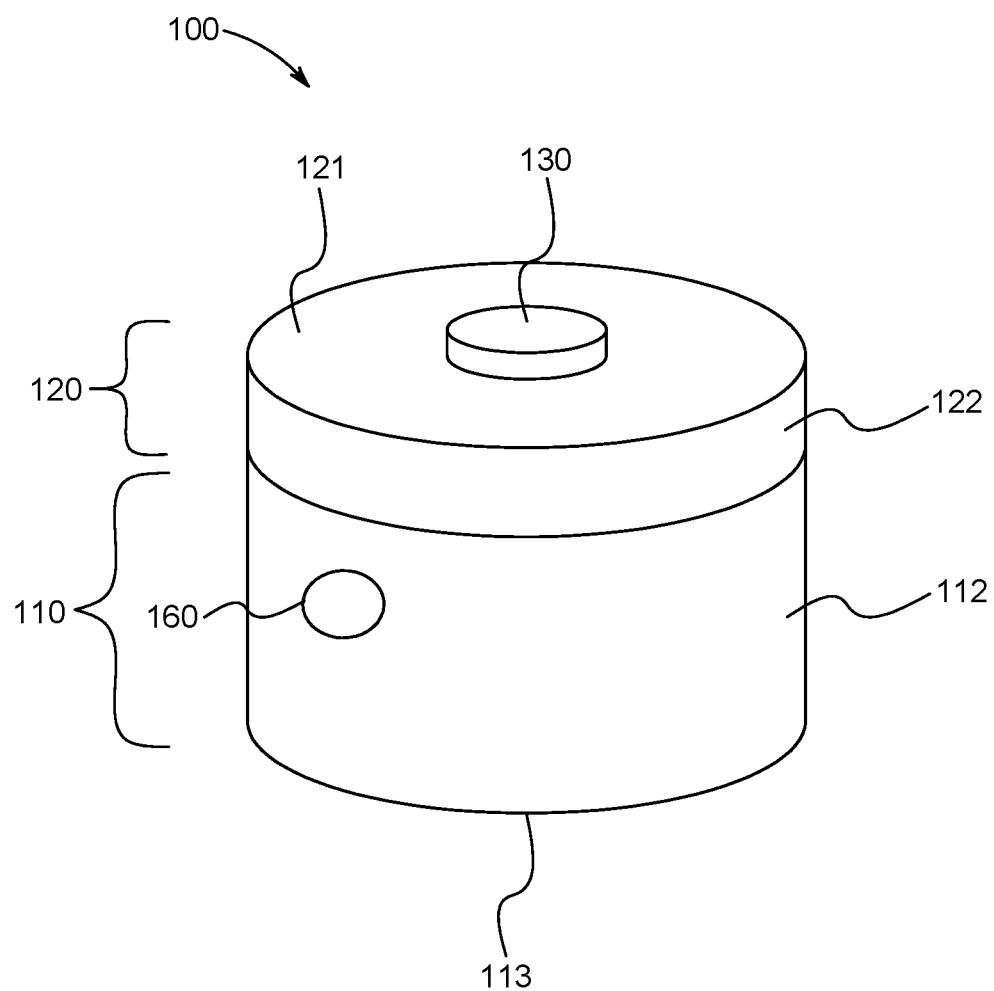
FIG. 1 illustrates an isometric view of a dental apparatus container in a closed position, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Dental Apparatus Container 100
Main Body 110
First Top Surface 111
First Cylindrical Surface 112
First Bottom Surface 113
Dental Apparatus-Receiving Aperture 114
Lid 120
Second Top Surface 121
Second Cylindrical Surface 122
Second Bottom Surface 123
Recessed Portion 124
Handle 130
Hinge 140
Haptic Unit 150
Power Button 160
Power Source 170

FIG. 1 illustrates an isometric view of a dental apparatus container 100 in a closed position, according to an exemplary embodiment of the present general inventive concept.

Figure 2:
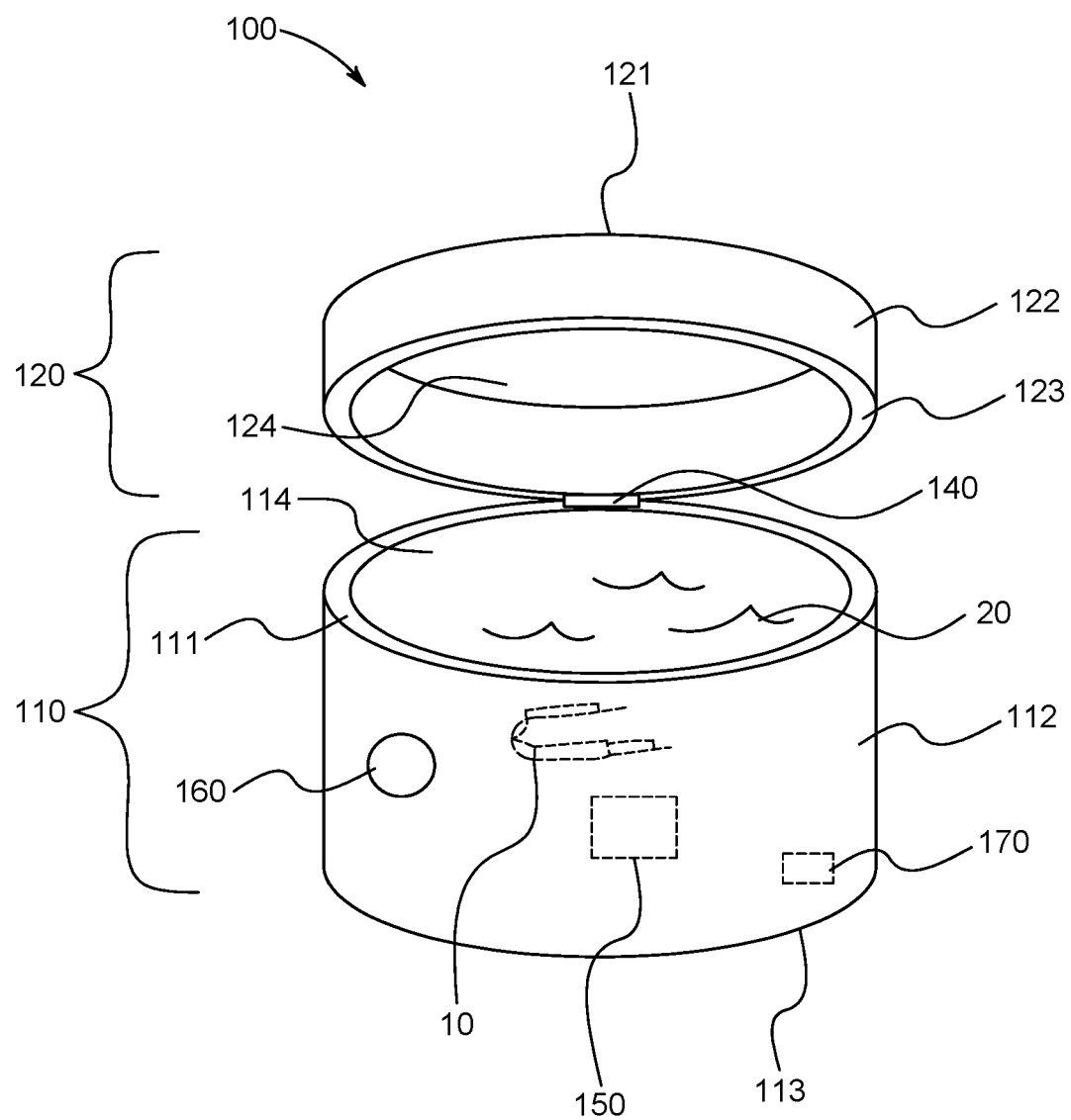
FIG. 2 illustrates an isometric view of the dental apparatus container in an open position, according to an exemplary embodiment of the present general inventive concept.

FIG. 2 illustrates an isometric view of the dental apparatus container 100 in an open position, according to an exemplary embodiment of the present general inventive concept.

The dental apparatus container 100 may be constructed from at least one of metal, plastic, wood, glass, and rubber, etc., but is not limited thereto. Additionally, the dental apparatus container 100 may be resistant to rust.

Referring to FIGS. 1 and 2, the dental apparatus container 100 is illustrated to have a cylindrical shape. However, the dental apparatus container 100 may be a rectangular prism, rectangular, circular, pentagonal, hexagonal, octagonal, or any other shape known to one of ordinary skill in the art, but is not limited thereto.

Referring again to FIGS. 1 and 2, the dental apparatus container 100 may include a main body 110, a lid 120, a handle 130, a hinge 140, a haptic unit 150, a power button 160, and a power source 170, but is not limited thereto.

Referring to FIG. 2, the main body 110 may include a first top surface 111, a first cylindrical surface 112, a first bottom surface 113, and a dental apparatus-receiving aperture 114, but is not limited thereto.

The main body 110 may have a predetermined height. For example, the main body 110 may have a height of at least two inches. Additionally, the main body 110 may have a predetermined diameter. For example, the main body 110 may have a diameter of at least four inches.

At least a portion of the first cylindrical surface 112 may have any color and/or design disposed thereupon. Specifically, the first cylindrical surface 112 may have a design based on a preference of a user, such that the main body 110 may appeal to the user.

The first bottom surface 113 may include a smooth surface and/or a textured surface, such as a plurality of bubbled protrusions extending away therefrom. As such, the textured surface may increase friction to prevent the main body 110 from movement while disposed on a planar surface, such as a table and/or a countertop.

The dental apparatus-receiving aperture 114 may receive a dental apparatus 10 (e.g., dentures, night guards, retainers) therein. Additionally, the dental apparatus-receiving aperture 114 may receive a cleaning fluid 20 therein, such that the cleaning fluid 20 may clean the dental apparatus 10.

The lid 120 may include a second top surface 121, a second cylindrical surface 122, a second bottom surface 123, and a recessed portion 124, but is not limited thereto.

The lid 120 may cover at least a portion of the dental apparatus-receiving aperture 114, such that the dental apparatus 10 may be obscured.

The lid 120 may have a predetermined height. Additionally, the lid 120 may have a predetermined diameter. Moreover, the predetermined diameter of the lid 120 may correspond to the predetermined diameter of the main body 110. In other words, the predetermined diameter of the lid 120 may be the same as the predetermined diameter of the main body 110.

At least a portion of the second top surface 121 and/or at least a portion of the second cylindrical surface 122 may have any color and/or design disposed thereupon. Specifically, the second top surface 121 and/or the second cylindrical surface 122 may have a design based on the preference of the user, such that the lid 120 may appeal to the user.

The second bottom surface 123 of the lid 120 may connect to the first top surface 111 of the main body 110.

The handle 130 may be disposed on at least a portion of the second top surface 121 of the lid 120. The handle 130 may facilitate gripping thereof.

The hinge 140 may be disposed on at least a portion of the main body 110 and/or at least a portion of the lid 120. In other words, the lid 120 may be hingedly disposed on at least a portion of the main body 110. As such, the lid 120 may pivot from closed in a first position to at least partially open in a second position, such that the lid 120 pivots away from the main body 110 via the hinge 140.

Furthermore, the hinge 140 may move and stay at the second position until the user moves the lid 120. In other words, the hinge 140 may hold any position while open.

Alternatively, the lid 120 may be magnetically disposed on the main body 110. More specifically, the first top surface 111 and/or the second bottom surface 123 may have magnets disposed thereupon, such that the first top surface 111 may magnetically connect to the second bottom surface 123. Furthermore, the magnets may have an attractive force that prevents the lid 120 from removal in response to inverting the dental apparatus container 100, such that the second top surface 121 of the lid 120 may face the planar surface.

The haptic unit 150 may include various devices to simulate a vibration, including, but not limited to, vibration devices, pistons, mechanical rollers, compression devices, stretching devices, pressing devices, oscillators, gears, etc.

The haptic unit 150 may be disposed within at least a portion of the main body 110. Specifically, the haptic unit 150 may be disposed within at least a portion of the first cylindrical surface 112 and/or at least a portion of the dental apparatus-receiving aperture 114. The haptic unit 150 may move the cleaning fluid 20 within the dental apparatus-receiving aperture 114, such that the cleaning fluid 20 may contact the dental apparatus 10 with force. In other words, the haptic unit 150 may vibrate to increase movement of the cleaning fluid 20, such that a volume of the cleaning fluid 20 in contact with the dental apparatus 10 may be increased.

The power button 160 may include a button, a lever, a switch, a knob, and a dial, but is not limited thereto.

The power button 160 may be depressed to turn on and/or turn off the haptic unit 150. The haptic unit 150 may move the cleaning fluid 20 in response to depressing the power button 160 a first time. The haptic unit 150 may stop moving the cleaning fluid 20 in response to depressing the power button 160 a second time.

Additionally, the power button 160 may be depressed a first predetermined number of times and/or for a first predetermined duration of time to increase a vibration speed of the haptic unit 150. Alternatively, the power button 160 may be depressed a second predetermined number of times and/or a second predetermined duration of time to decrease a vibration speed of the haptic unit 150.

The power source 170 may include a power cord, a battery, a solar cell, but is not limited thereto. Additionally, the battery may include lithium-ion, nickel cadmium, nickel metal hydride, alkaline, etc., but is not limited thereto.

The power source 170 may send power to at least one of the haptic unit 150 and the power button 160.

Therefore, the dental container 100 may prevent the dental apparatus 10 from being viewed, as well as, appeal to the user based on the preference of the user. Additionally, the dental container 100 may improve cleaning of the dental apparatus 10.

The present general inventive concept may include a dental apparatus container 100, including a main body 110 to receive at least one of a dental apparatus 10 and cleaning fluid 20 therein, and a lid 120 connected to the main body 110 to cover at least a portion of the main body 110.

The lid 120 may be hingedly connected to the main body 110, such that the lid 120 may pivot from closed in a first position to at least partially open in a second position.

The hinge 140 may hold the lid 120 in the second position.

The lid 120 may magnetically connect to the main body 110.

The dental apparatus container 100 may further include a haptic unit 150 disposed within at least a portion of the main body 110 to vibrate the cleaning fluid 20, such that a volume of the cleaning fluid 20 in contact with the dental apparatus 10 may be increased.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A dental apparatus container, comprising:
   a main body to receive at least one of a dental apparatus and cleaning fluid therein, the main body comprising:
   a first top surface,
   a first magnet disposed on the first top surface,
   a first cylindrical surface circumferentially disposed around a perimeter of a dental-apparatus-receiving aperture and extending away from the first top surface, and
   a first bottom surface disposed on the first cylindrical surface, such that the first top surface is disposed at a distance furthest from the first bottom surface; and
   a lid connected to the main body to cover at least a portion of the main body, the lid comprising:
   a second cylindrical surface circumferentially disposed around a perimeter of a recessed portion,
   a second bottom surface disposed on a bottom edge of the second cylindrical surface to connect to an entire surface area of the first top surface in response to the lid closing over the main body to prevent the cleaning fluid from exiting the main body, and
   a second magnet disposed on the second bottom surface to magnetically connect the second bottom surface to the first top surface.

2. The dental apparatus container of claim 1, wherein the lid is hingedly connected to the main body, such that the lid pivots from closed in a first position to at least partially open in a second position.

3. The dental apparatus container of claim 2, wherein the hinge holds the lid in the second position.

4. The dental apparatus container of claim 1, further comprising:
   a haptic unit disposed within at least a portion of the main body to vibrate the cleaning fluid, such that a volume of the cleaning fluid in contact with the dental apparatus is increased.

5. A dental apparatus container, comprising:
   a main body to receive at least one of a dental apparatus and cleaning fluid therein, the main body comprising:
   a first top surface,
   a first magnet disposed on a bottom surface of the main body,
   a first cylindrical surface circumferentially disposed around a perimeter of a dental-apparatus-receiving aperture and extending away from the first top surface, and
   a first bottom surface disposed on the first cylindrical surface, such that the first top surface is disposed at a distance furthest from the first bottom surface; and
   a lid connected to the main body to cover at least a portion of the main body, such that a diameter of the lid is equivalent to a diameter of the main body, such that the lid remains closed in response to inverting the main body and the lid while the lid is closed, the lid comprising:
   a second cylindrical surface circumferentially disposed around a perimeter of a recessed portion,
   a second bottom surface disposed on a bottom edge of the second cylindrical surface to connect to an entire surface area of the first top surface in response to the lid closing over the main body to prevent the cleaning fluid from exiting the main body, and
   a second magnet disposed on the second bottom surface to magnetically connect the second bottom surface to the first top surface.

\* \* \* \* \*